US009589435B2

(12) United States Patent
Finlow-Bates

(10) Patent No.: US 9,589,435 B2
(45) Date of Patent: Mar. 7, 2017

(54) PROVIDING ALERTS, VOUCHERS, OR COUPONS ONCE A PLURALITY OF GEO-FENCES HAVE BEEN BREACHED A NUMBER OF TIMES

(71) Applicant: QUALCOMM Incorporated, San Diego, CA (US)

(72) Inventor: Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 13/715,346

(22) Filed: Dec. 14, 2012

(65) Prior Publication Data

US 2014/0167961 A1    Jun. 19, 2014

(51) Int. Cl.
   *G08B 13/00*    (2006.01)
   *G08B 13/22*    (2006.01)
   *H04W 4/02*    (2009.01)

(52) U.S. Cl.
   CPC ............ *G08B 13/22* (2013.01); *H04W 4/021* (2013.01)

(58) Field of Classification Search
   USPC ............. 340/541, 545.1, 546, 545.2, 426.18, 340/426.19, 539.13, 539.11, 5.1, 5.2, 5.7; 455/455, 422.1, 456.1, 456.3; 702/150, 702/408; 705/7.29, 7.34, 14.4, 14.49, 705/14.68, 14.72
   See application file for complete search history.

(56) References Cited

U.S. PATENT DOCUMENTS

| | | | |
|---|---|---|---|
| 6,400,265 B1 * | 6/2002 | Saylor et al. | 340/531 |
| 7,681,791 B1 * | 3/2010 | Beveridge | 235/385 |
| 7,848,765 B2 | 12/2010 | Phillips et al. | |
| 7,999,670 B2 | 8/2011 | McClellan et al. | |
| 8,065,342 B1 * | 11/2011 | Borg | G06Q 10/06 455/456.1 |
| 8,284,070 B2 * | 10/2012 | Chaudhari et al. | 340/686.1 |
| 8,456,293 B1 * | 6/2013 | Trundle et al. | 340/517 |
| 8,825,087 B2 * | 9/2014 | Hamill | 455/456.3 |
| 2005/0239479 A1 * | 10/2005 | Bednasz | H04M 1/72572 455/456.1 |

(Continued)

FOREIGN PATENT DOCUMENTS

| | | |
|---|---|---|
| CN | 102577443 A | 7/2012 |
| EP | 2518678 A1 | 10/2012 |

(Continued)

OTHER PUBLICATIONS

International Search Report and Written Opinion—PCT/US2013/074967—ISA/EPO—Aug. 19, 2014.

(Continued)

*Primary Examiner* — Travis Hunnings
(74) *Attorney, Agent, or Firm* — Muncy, Geissler, Olds & Lowe, P.C.

(57) ABSTRACT

The disclosure is directed to providing a notification based on breaching a plurality of geo-fence perimeters. An embodiment detects a breach related to the plurality of geo-fence perimeters, the breach corresponding to a breach of one of the plurality of geo-fence perimeters, records the breach as one of a plurality of breaches, determines whether the plurality of breaches meet one or more conditions, and if the plurality of breaches meet the condition, issues a notification.

34 Claims, 11 Drawing Sheets

(56) References Cited

U.S. PATENT DOCUMENTS

| | | | |
|---|---|---|---|
| 2007/0276581 A1* | 11/2007 | Bae | G08G 1/16 701/117 |
| 2008/0186165 A1* | 8/2008 | Bertagna et al. | 340/539.13 |
| 2009/0009321 A1* | 1/2009 | McClellan | G08G 1/207 340/539.13 |
| 2009/0083122 A1* | 3/2009 | Angell et al. | 705/10 |
| 2010/0241496 A1 | 9/2010 | Gupta et al. | |
| 2011/0070863 A1 | 3/2011 | Ma et al. | |
| 2011/0106599 A1 | 5/2011 | McCann et al. | |
| 2012/0047011 A1 | 2/2012 | Rippetoe et al. | |
| 2012/0094769 A1 | 4/2012 | Nguyen et al. | |
| 2012/0126974 A1 | 5/2012 | Phillips et al. | |
| 2012/0136998 A1 | 5/2012 | Hough et al. | |
| 2012/0197720 A1 | 8/2012 | Bezancon et al. | |
| 2013/0099977 A1* | 4/2013 | Sheshadri et al. | 342/450 |
| 2014/0128095 A1* | 5/2014 | Finlow-Bates et al. | 455/456.1 |

FOREIGN PATENT DOCUMENTS

| | | |
|---|---|---|
| GB | 2488349 A | 8/2012 |
| WO | 2008094685 A1 | 8/2008 |
| WO | 2010107817 | 9/2010 |

OTHER PUBLICATIONS

Supplementary European Search Report—EP13826805—Search Authority—Munich—Jul. 25, 2016.

* cited by examiner

PROVIDING ALERTS, VOUCHERS, OR COUPONS ONCE A PLURALITY OF GEO-FENCES HAVE BEEN BREACHED A NUMBER OF TIMES

BACKGROUND OF THE INVENTION

1. Field of the Invention

The disclosure is directed to providing alerts, vouchers, or coupons once a plurality of geo-fences has been breached a number of times.

2. Description of the Related Art

A geo-fence is a virtual perimeter surrounding a real-world geographic area. A location-aware device (i.e. a device that can determine its position) can be loaded with a geo-fence. The device compares its position to the coordinates of the stored geo-fence. If the device enters or exits (i.e. breaches) the geo-fence, the device can display a notification to the user and/or send a notice to a remote computer.

In some situations, the party that setup the geo-fence may wish to track the number of times a user enters or exits the geo-fence, whether or not the user re-enters the geo-fence within a certain period of time, the order that the user proceeds from one geo-fence to another, and the like. For example, a chain of restaurants or shops may wish to reward customers who visit a given number of different locations over a period of time by sending them a discount coupon or some type of promotional voucher. Alternatively, the proprietor of a single shop or restaurant may wish to reward repeat customers with such offers.

As another example, a parking garage or set of parking spaces, such as the street parking zones maintained by a municipality, may have a restriction that vehicles may not revisit the same location within a specified time, or that the parking spaces may not be used more than a certain number of times within a given period of time. The operators of such a parking facility may wish to alert customers that they have exceeded their allowed number of visits.

Accordingly, the various embodiments track, among other things, the number of times a user enters or exits one or more geo-fences, the order in which the user enters and exits related geo-fences, the time the user spends inside or outside one or more geo-fences, and the like.

SUMMARY

The disclosure is directed to providing a notification based on breaching a plurality of geo-fence perimeters. An embodiment detects a breach related to the plurality of geo-fence perimeters, the breach corresponding to a breach of one of the plurality of geo-fence perimeters, records the breach as one of a plurality of breaches, determines whether the plurality of breaches meet one or more conditions, and if the plurality of breaches meet the condition, issues a notification.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 8 illustrates an exemplary embodiment in which an event is triggered if a user enters any of a given number of geo-fences a given number of times without entering one or more other geo-fences in between.

DETAILED DESCRIPTION

Figure 1:
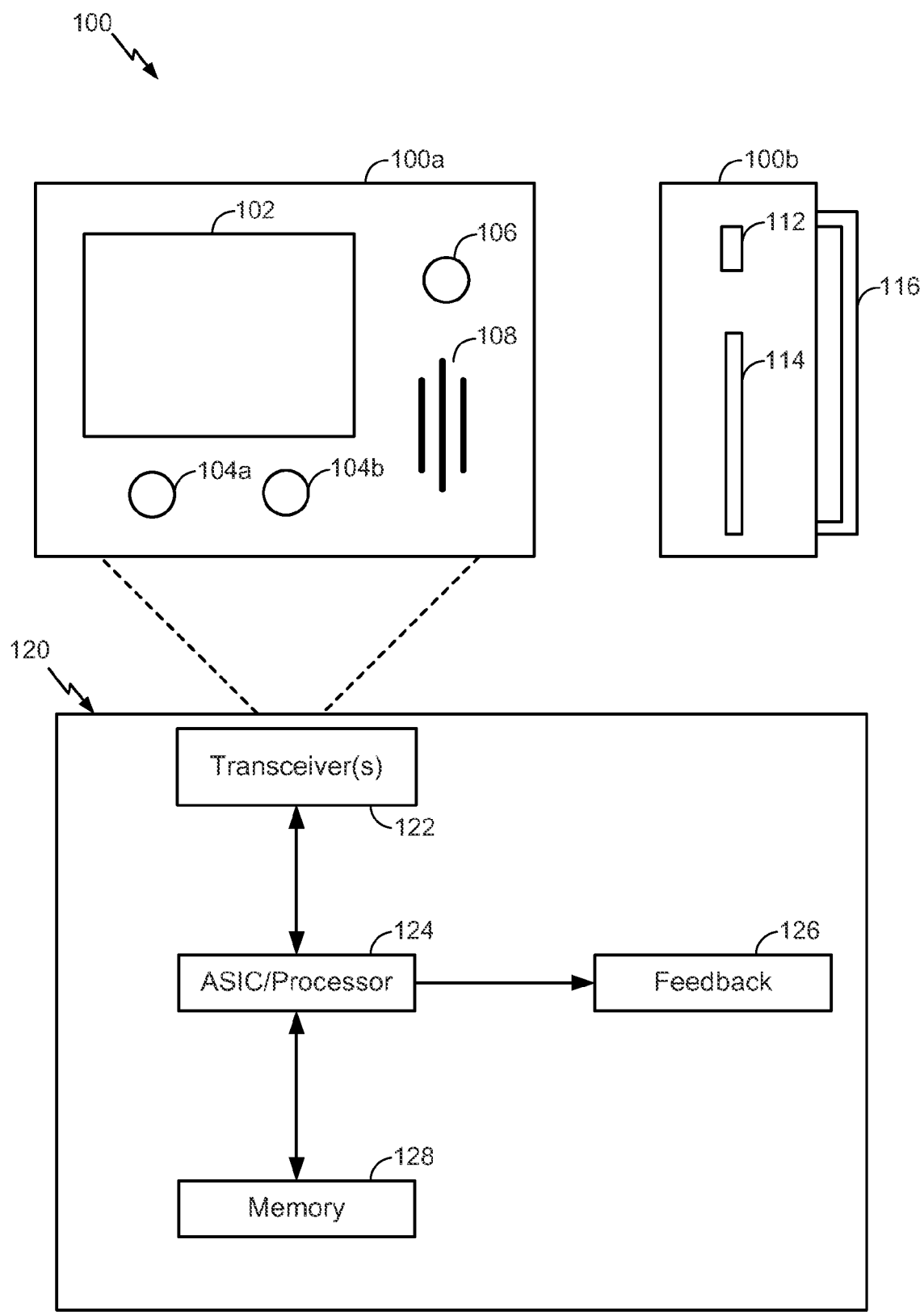
FIG. 1 illustrates a simplified apparatus according to one or more embodiments.

Aspects of the various embodiments are disclosed in the following description and related drawings directed to specific embodiments are illustrated. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments include the discussed feature, advantage or mode of operation.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the various embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A geo-fence is a virtual perimeter surrounding or defining a real-world geographic area. A location-aware device (i.e. a device that can determine its position) can be loaded with a geo-fence. The device then compares its position to the coordinates of the stored geo-fence. If the device enters or exits (i.e. breaches) the geo-fence, the device can display a notification to the user and/or send a notice to a remote computer.

In some situations, the party that setup the geo-fence may wish to track the number of times a user enters or exits the geo-fence, whether or not the user re-enters the geo-fence within a certain period of time, the order that the user proceeds from one geo-fence to another, etc. For example, a chain of restaurants or shops may wish to reward customers who visit a given number of different locations over a period of time by sending them a discount coupon or some type of promotional voucher. Alternatively, the proprietor of a single shop or restaurant may wish to reward repeat customers with such offers.

As another example, a parking garage or set of parking spaces, such as the street parking zones maintained by a municipality, may have a restriction that vehicles may not revisit the same location within a specified time, or that the parking spaces may not be used more than a certain number of times within a given period of time. The operators of such a parking facility may wish to alert customers that they have exceeded their allowed number of visits.

Accordingly, the various embodiments track, among other things, the number of times a user enters or exits one or more geo-fences, the order in which the user enters and exits related geo-fences, the time the user spends inside or outside one or more geo-fences, and the like.

A geo-fence administrator can define a set of related geo-fences, or a single geo-fence with multiple sub-areas. The set of geo-fences may include all the restaurants in a given chain, all the retail establishments in a given shopping center, the parking spaces operated by a municipality, and the like. The geo-fence for a single location can be stored as an independent geo-fence and linked to the related geo-fences, or it can be stored as a sub-area of a geo-fence that encompasses all of the related locations. This disclosure uses the term "geo-fence" to refer to the geo-fence for a single location, whether the geo-fence is stored as an independent geo-fence or a sub-area of a larger geo-fence.

Depending on the level of precision of the positioning system, the geo-fence may be a single point and an associated radius instead of a set of coordinates defining a geographic perimeter. For example, if a geo-fence encompasses a single parking space, the geo-fence data for that parking space may simply be the coordinates of the center of the parking space and a radius of, for example, four feet from those center coordinates, rather than the coordinates of each corner of the parking space.

The administrator can define a set of rules related to breaching a geo-fence. The rules can define what action, if any, should be taken when a user enters a geo-fence, exits a geo-fence, visits a certain number of geo-fences, visits certain geo-fences in a certain order, and the like. Various examples of possible rule implementations are illustrated in FIGS. 4-10.

A state machine and/or set of counters can track geo-fence breaches. Each time a user breaches a geo-fence, the state machine changes state, and if specified in the rules, starts or stops one or more timers. Alternatively, each time a user breaches a geo-fence, one or more counters are incremented or decremented, and if specified in the rules, one or more timers are started or stopped. When a timer expires, the state machine changes state, or the relevant counter is incremented or decremented, as defined in the rules. When the state machine reaches a particular state, or a given counter reaches or exceeds a set threshold, an action is taken, as defined in the rules.

The action can be sending the user an alert, such as a coupon or voucher or some other incentive, a warning, a pointer to additional information, and the like. Alternatively, the action can be recording statistics related to the user, such as the user's number of breaches, locations of the breaches, time between breaches, and the like. The action can also be sending an alert to a third party. The alert may notify the third party of the breach and/or the user's statistics. The alert may be in the form of a short message service (SMS) message, multimedia messaging service (MMS) message, or email. The pointer to additional information can be a uniform resource locator (URL), an email address, a web page, and the like.

An application configured to perform the functionality described herein can be installed on a location-aware user device. For example, the user device can download, store, and access the geo-fence data, rules, state machines or counters, and/or alerts to perform the functionality described herein. The user device can track geo-fence breaches and issue alerts based on the stored rules. The alerts may be stored on the user device and presented to the user and/or transmitted to a third party server according to the rules.

The user device can also communicate with a server to perform the functionality described herein. For example, the user device can communicate its position to a server, which can determine if a breach has occurred and issue alerts based on the rules. Alternatively, the user device can track breaches and communicate them to the server, which can issue alerts based on the rules. In yet another example, the user device can track the breaches, determine whether or not an alert should be issued, and notify the server to issue the alert.

These and other aspects of the various embodiments will be described in more detail with respect to the following figures.

FIG. 1 illustrates a simplified location-aware apparatus 100 according to the various embodiments. Apparatus 100 can determine its position from satellite and/or terrestrial positioning signals and transmit its position to a remote computer. Such an apparatus can be used to track the location of various assets, such as vehicles, shipping crates, livestock, and the like.

The front 100a of apparatus 100 may include a visual display 102 (such as a liquid crystal display (LCD)), programming/power buttons 104a and 104b, a light-emitting diode (LED) 106, and/or a speaker 108. Visual display 102 may be used to navigate various functions of apparatus 100. LED 106 may provide a visual indication of various statuses of apparatus 100, such as ON/OFF, battery status, etc. The side 100b of apparatus 100 may include a universal serial bus (USB) port 112 and an external memory card slot 114, such as for secure digital (SD) cards. USB port 112 may be used to charge a rechargeable battery housed within the body of apparatus 100. External memory card slot 114 may be used to receive an SD card loaded with geo-fence coordinates and/or other data, such as user options, dynamic gate criteria, etc. Speaker 108 may be used to provide audible warnings and/or feedback to a wearer and/or user. The apparatus 100 may also include a connector 116 for attaching apparatus 100 to an asset.

In an embodiment, visual display 102 may be a touch screen display, in which case there would be no need for multiple programming buttons 104a and 104b. Rather, only a power button would be needed. In another embodiment, apparatus 100 may be connected to a computer, such as the remote server, via a USB cable connected to USB port 112, and programmed through the computer's user interface. As such, there would be no need for visual display 102 or programming buttons 104a and 104b other than a power button.

The wireless communication between the apparatus 100 and the remote server can be based on different technologies, such as code division multiple access (CDMA), wideband CDMA (W-CDMA), time division multiple access (TDMA), frequency division multiple access (FDMA), orthogonal frequency division multiplexing (OFDM), the global system for mobile communications (GSM), 3GPP Long Term Evolution (LTE), or other protocols that may be used in a wireless communications network or a data communications network. Accordingly, the illustrations provided herein are not intended to limit the various embodiments and are merely to aid in the description of aspects of the embodiments.

Using an external memory card may allow for geo-fence perimeters to be quickly transferred from one apparatus 100 to another. In an embodiment, however, apparatus 100 may include sufficient internal storage for storing geo-fence information such that there would be no need for an external memory card. In an embodiment, apparatus 100 may receive geo-fence information via an internal or external antenna (not shown) capable of receiving wireless signals, such as cellular signals, wireless local area network (WLAN) signals (such as Wi-Fi), radio-frequency identification (RFID) signals, and the like.

While the internal components of apparatus 100 can be embodied with different hardware configurations, a basic high-level configuration is shown as hardware platform 120. The platform 120 can include an application specific integrated circuit (ASIC) 124, or other processor, microprocessor, logic circuit, or other data processing device, which is coupled to one or more transceivers 122 and memory 128. In one embodiment, the transceiver(s) 122 can receive coordinates representing the perimeter(s) of a geo-fence and send it to the ASIC/Processor 124. For example, the transceiver(s) can receive the coordinates via Wi-Fi, RFID, LTE, CDMA, WCDMA, GSM, etc. In another embodiment, the memory 128 can have the coordinates loaded on it. For example, the memory can be a removable media, which would allow a user to set the coordinates on the removable media on a different device and then plug it into the apparatus for use. The removable media may include but is not limited to an optical disk, SD card, or memory stick. In another embodiment, the memory 128 can be internal memory, which can be programmed with the coordinates via a display interface 102 or USB port 112. The memory 128 can be comprised of read-only memory (ROM), random-access memory (RAM), electrically erasable programmable ROM (EEPROM), flash cards, SD Card or any memory common to computer platforms.

In one embodiment, the ASIC/Processor 124 determines a proximate location of the mobile device using a hybrid combination of a satellite-based proximate location and an auxiliary local station-based proximate station. For example, the ASIC/Processor 124 can receive location information and/or position information from one or more transceivers 122. For example, the transceiver 122 can receive location information from base stations, femto cells, pico cells, RFID, etc. Additionally, it can receive positioning information from satellite based systems (SPS) such as GPS and GLONASS. Each transceiver 122 can also receive RF signals that can be used in positioning from local stations. For example, a transceiver 122 can receive RF signals from Wi-Fi, femto cells, pico cells, RFID, etc.

In one embodiment, based on a comparison of the proximate location of the mobile device to the coordinates representing the perimeter of the geo-fence, the ASIC/Processor 124 can provide feedback. For example, if the ASIC/Processor 124 is outside the geo-fence, the ASIC/Processor 124 can trigger feedback 126, which may include sending a notification to another device, sending feedback to another device, or providing feedback to a wearer of the apparatus 100. The feedback may include, but is not limited, to sending the wearer a shock, playing a warning sound, sending a notification to a third party, sending a notification to the wearer of the device, etc. The platform 120 can receive and execute software applications, data, and/or commands transmitted over a wireless network, USB cable, SD card, etc. The apparatus 100 can also be operably coupled to external devices, such as display 102, buttons 104a and 104b, and LED 106, among other components, as is known in the art.

Accordingly, an embodiment can include an apparatus with the ability to perform the functions described herein. As will be appreciated by those skilled in the art, the various logic elements can be embodied in discrete elements, software modules executed on a processor, or any combination of software and hardware to achieve the functionality disclosed herein. For example, ASIC/Processor 124, memory 128, and transceiver(s) 122 may all be used cooperatively to load, store, and execute the various functions disclosed herein and thus the logic to perform these functions may be distributed over various elements. Alternatively, the functionality could be incorporated into one discrete component. Therefore, the features of the apparatus 100 in FIG. 1 are to be considered merely illustrative and the invention is not limited to the illustrated features or arrangement.

Figure 2:
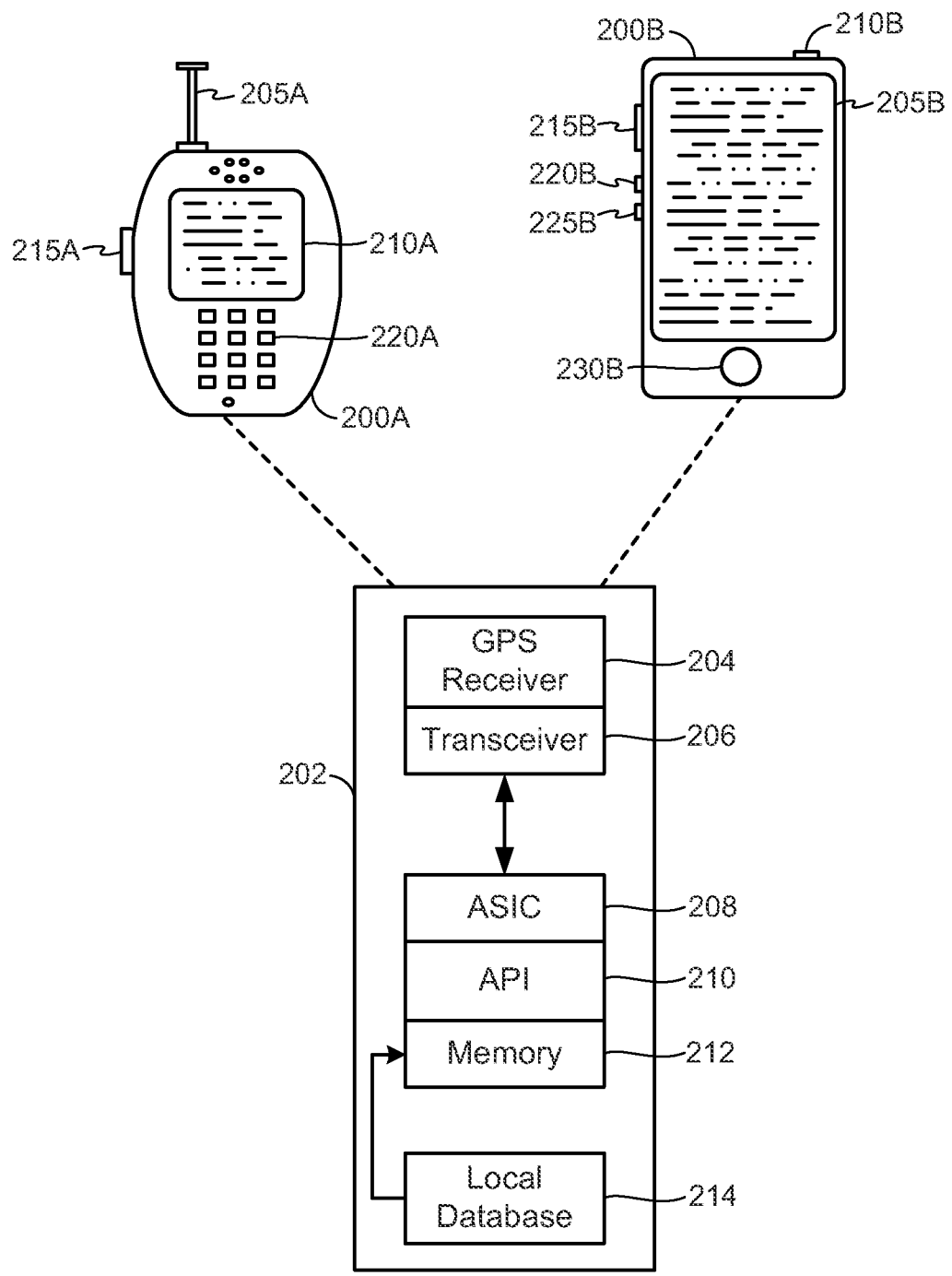
FIG. 2 illustrates examples of user equipments (UEs) in accordance with one or more embodiments.

FIG. 2 illustrates examples of UEs in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the radio access network (RAN) that may ultimately come from the core network, the Internet and/or other remote servers and networks. The platform 202 can also independently execute locally stored applications without RAN interaction. The platform 202 can include a GPS receiver 204 (or other receiver for satellite navigation) and transceiver 206 operably coupled to an ASIC 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

The UEs 200A and 200B can obtain their geographic position via various satellite-based positioning systems known in the art, such as GPS, assisted GPS (A-GPS), SPS, GLONASS, etc. The UEs 200A and 200B may also augment the satellite-based positioning with terrestrial radio frequency (RF) signals, such as wide area augmentation system (WAAS), differential global positioning system (DGPS), etc., as is known in the art. The UEs 200A and 200B may also use an inertial navigation system (INS) to determine or augment its position. In this disclosure, the terms "geographic location" and "geographic position" are used interchangeably.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The UEs 200A and/or 200B can communicate wirelessly based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs 200A and 200B from the radio access network (RAN) using a variety of networks and configurations. Accordingly, the illustrations provided herein are not intended to limit the embodiments of the invention and are merely to aid in the description of aspects of embodiments of the invention.

Figure 3:
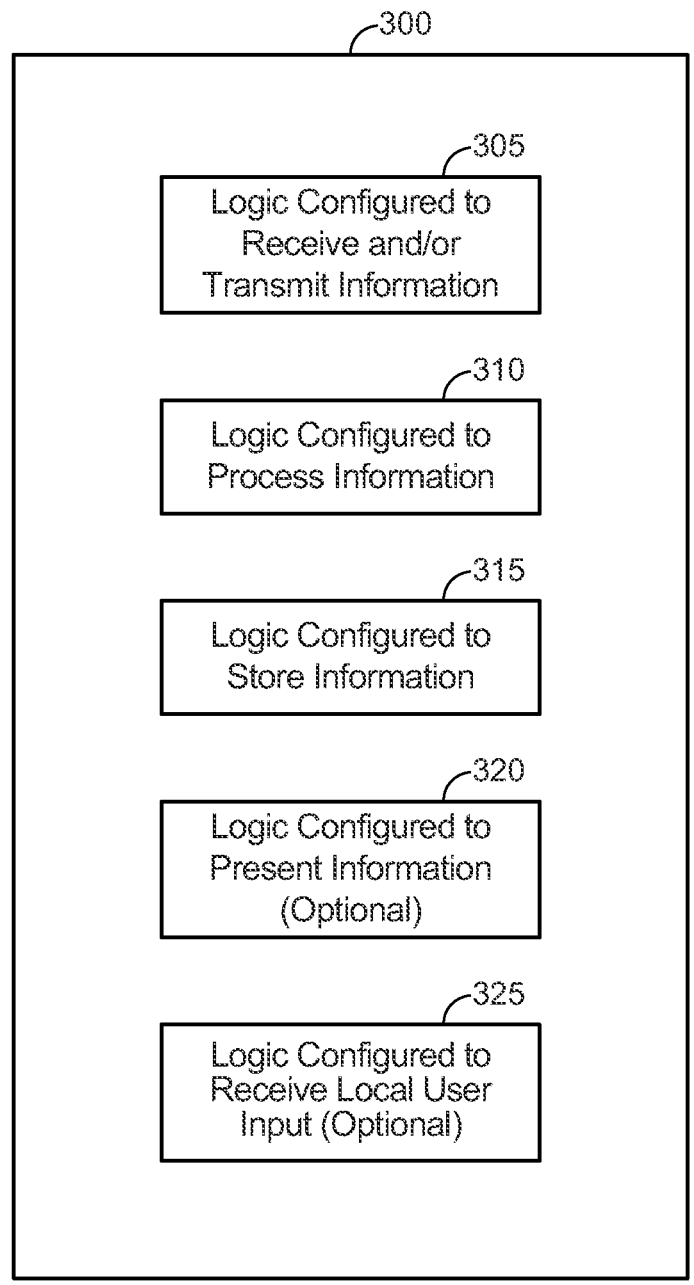
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to apparatus 100 and UEs 200A or 200B. Thus, communication device 300 can correspond to any electronic device that is configured to communicate with (or facilitate communication with) one or more other entities over a wireless communications system.

Referring to FIG. 3, the communication device 300 includes logic configured to receive and/or transmit information 305. In an example, if the communication device 300 corresponds to a wireless communications device (e.g., apparatus 100, UE 200A or 200B, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., a radio frequency (RF) antenna, a MODEM, a modulator and/or demodulator, etc.). In another example, the logic configured to receive and/or transmit information 305 can correspond to a wired communications interface (e.g., a serial connection, a universal serial bus (USB) or Firewire connection, an Ethernet connection, etc.). Thus, if the communication device 300 corresponds to some type of network-based server, the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the types of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, a hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, high-definition multimedia interface (HDMI), etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user. The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user. The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
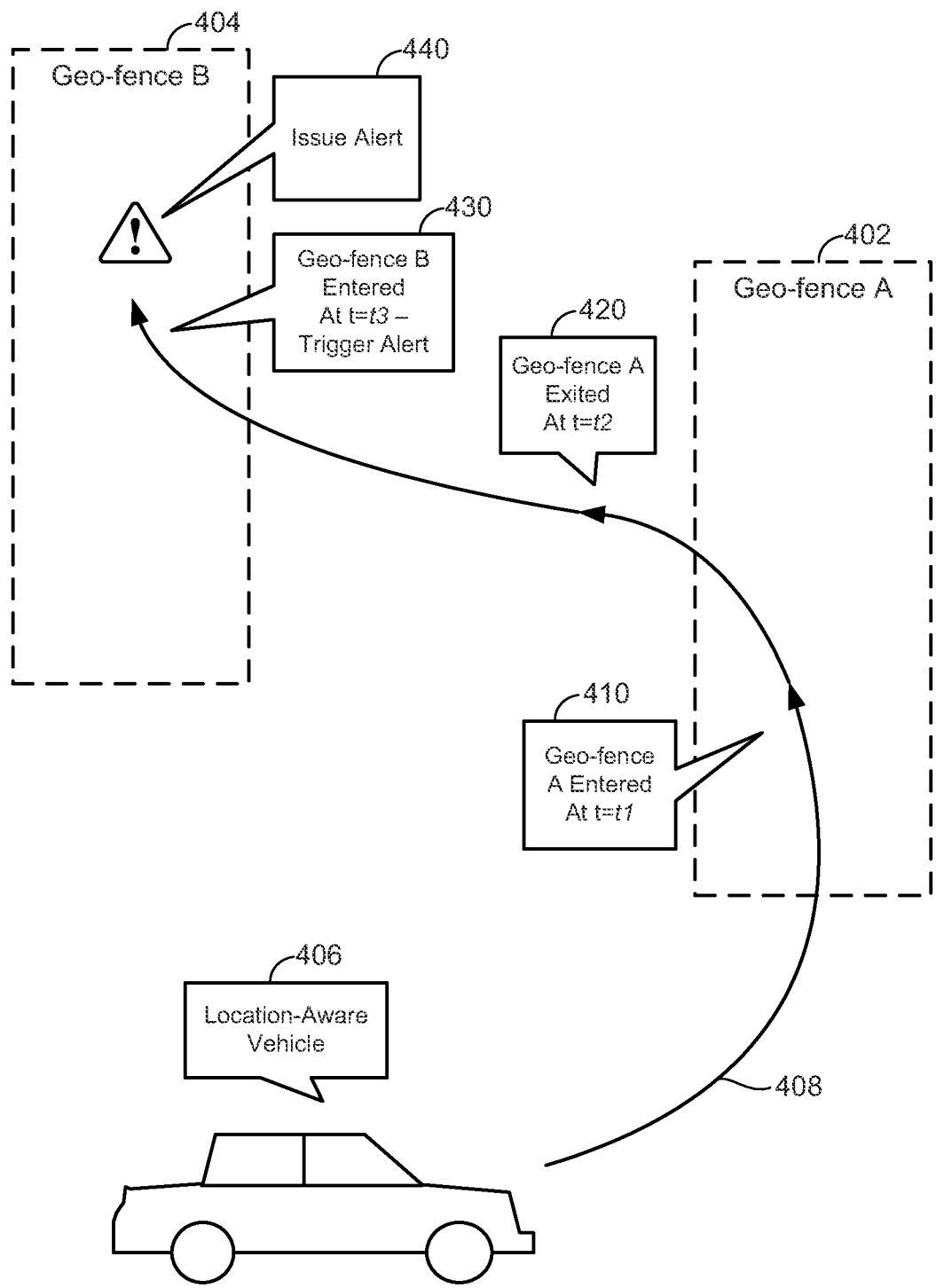
FIG. 4 illustrates an exemplary embodiment in which an alert is triggered if a vehicle enters a second geo-fence within a certain period of time of leaving a first geo-fence.

FIG. 4 illustrates an exemplary embodiment in which an alert is triggered if a vehicle enters a second geo-fence within a certain period of time after leaving a first geo-fence.

FIG. 4 illustrates a geo-fence A 402 and a geo-fence B 404. As an example, geo-fences A 402 and B 404 may be separate parking spaces in a parking garage or municipal parking lot.

A location-aware vehicle 406 follows a path 408 from geo-fence A 402 to geo-fence B 404. Vehicle 406 is location-aware either because the driver has a location-aware user device running an application according to an embodiment, such as UE 200A or UE 200B, or the vehicle 406 has a location-aware device, such as apparatus 100, installed or present. If the location-aware device is not installed in the vehicle 406, it may, for example, be given to the driver when the vehicle 406 enters the parking garage.

In the example of FIG. 4, entering another parking space in the same parking garage or municipal parking lot within a certain period of time triggers an alert. At 410, the vehicle 406 enters geo-fence A 402 at time t1. The breach is recorded, either at the location-aware device, a server, or both. At 420, the vehicle 406 exits geo-fence A 402 at time t2 and the breach is recorded. At 430, the vehicle 406 enters geo-fence B 404 at time t3 and the breach is recorded.

In the example of FIG. 4, the amount of time between time t2 and time t3 is less than the threshold period of time that must elapse before the same vehicle can park in a different space within the same lot. Accordingly, the breach at 430 triggers an alert at 440. The alert may be for the driver of vehicle 406, the operator of the parking lot, or both. The location-aware device may display the alert to the driver. The alert may be in the form of a warning that the vehicle 406 is not permitted to park within geo-fence B 404 at that time. The alert may also indicate the amount of time remaining before the vehicle 406 can park within geo-fence B 404.

Figure 5:
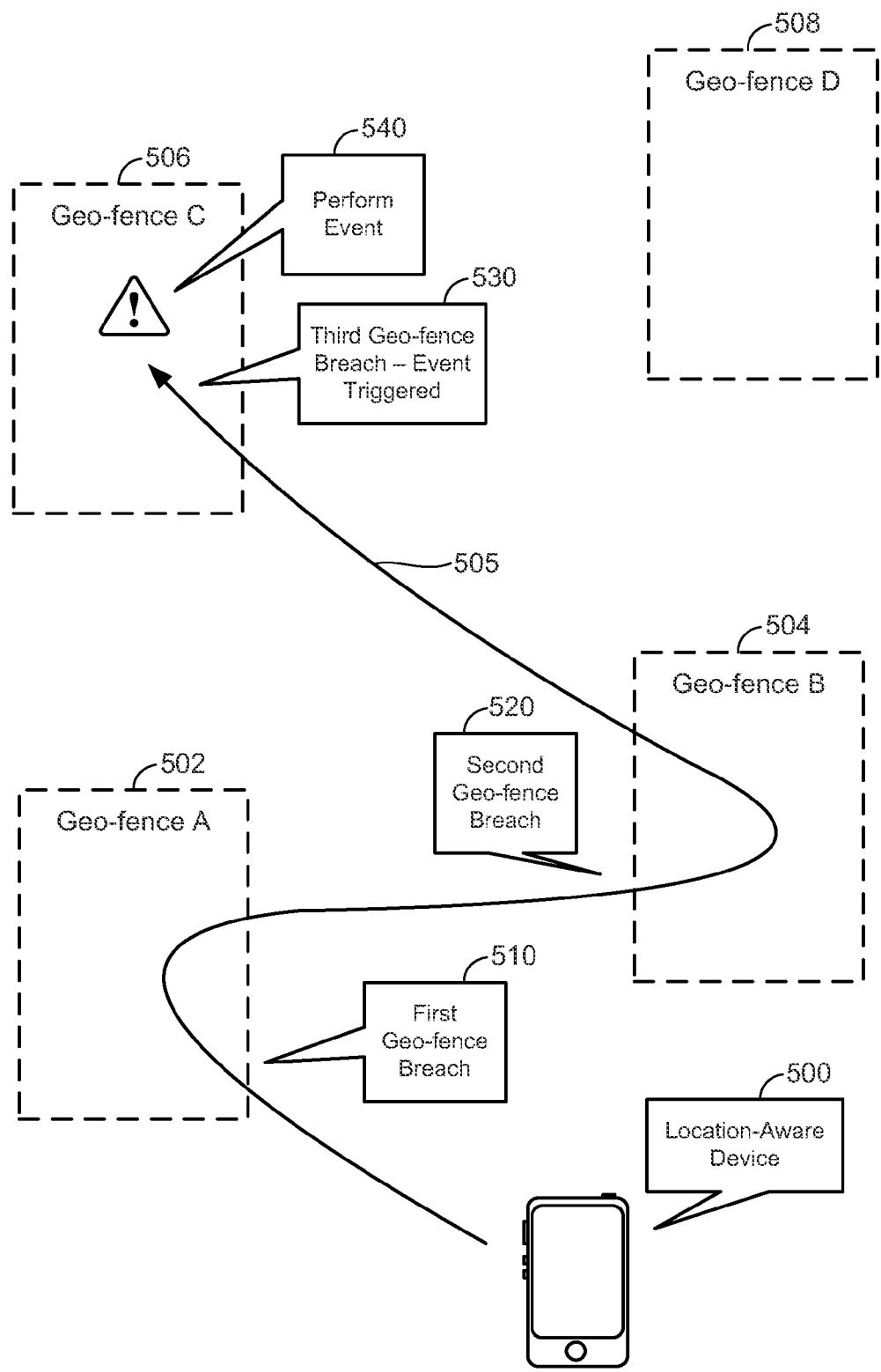
FIG. 5 illustrates an exemplary embodiment in which an event is triggered after a user visits a given number of related geo-fences.

FIG. 5 illustrates an exemplary embodiment in which an event is triggered after a user visits a given number of related geo-fences. FIG. 5 illustrates geo-fences A 502, B 504, C 506, and D 508. As an example, geo-fences A 502, B 504, C 506, and D 508 may be different branches of the same chain of restaurants.

A user with a location-aware device 500 follows path 505 from geo-fence A 502 to geo-fence B 504 to geo-fence C 506. At 510, device 500 enters geo-fence A 502 and the breach is recorded. At 520, device 500 enters geo-fence B 504 and the breach is recorded. At 530, device 500 enters geo-fence C 506 and the breach is recorded.

In the example of FIG. 5, after a user visits three related geo-fences, the user is issued a coupon or voucher giving the user a discount on a product or service at any of the locations encompassed by geo-fences A 502, B 504, C 506, and D 508. Accordingly, the breach at 530 triggers this event, and at 540, the coupon or voucher is issued.

Figure 6:
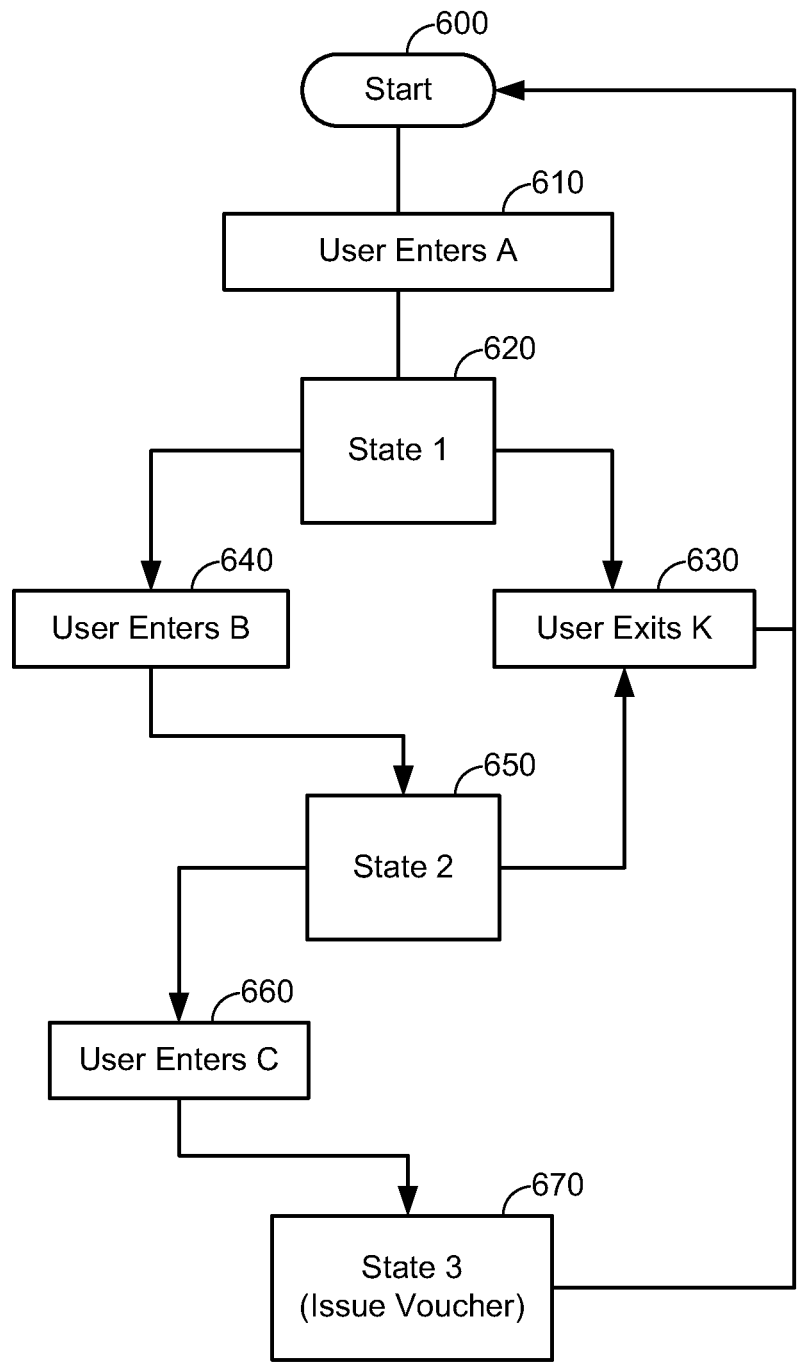
FIG. 6 illustrates an exemplary embodiment in which an event is triggered after a user enters a given number of geo-fences without leaving another geo-fence.

FIG. 6 illustrates an exemplary embodiment in which an event is triggered after a user enters a given number of geo-fences without leaving another geo-fence. Specifically, in the example of FIG. 6, if a user breaches geo-fences A, B, and C without leaving geo-fence K, the user receives a voucher or coupon. As an example, geo-fence K may be a shopping center and geo-fences A, B, and C may be retail shops within geo-fence K.

The embodiment of FIG. 6 is illustrated as being implemented as a state machine, but it may alternatively be implemented as a counter. The position of the user can be tracked with a location-aware device that the user carries, such as UE 200A or UE 200B.

The flow begins at 600. At 610, the user enters geo-fence A. At 620, the breach causes the state associated with the user to transition to state 1. Alternatively, the breach would cause a corresponding counter to be incremented. The user's location-aware device may track the user's state, for example, or a server may track the user's state based on breaches detected by the user's device. Alternatively, the user device may simply report its position to the server, and the server may track the user's breaches and state. At 630, the user exits geo-fence K, causing the flow to return to 600 and start over. If using a counter, the counter would be reset to 0.

If, however, the user enters geo-fence B at 640, then the user's state is updated to state 2 at 650. Alternatively, the counter would be incremented. If the user exits geo-fence K at this point (630), the flow returns to 600 and starts over. If using a counter, the counter would be reset to 0. If, however, the user enters geo-fence C at 660, then the user's state is updated to state 3 at 670. Alternatively, the counter would be incremented. Entering state 3 at 670 (or the counter reaching a count of "3") triggers an event. In the example of FIG. 6, that event is issuing a voucher or other coupon to the user. The user device may issue the alert if the voucher has been stored on the user device, or the server may issue the alert by sending the voucher to the user device.

Figure 7:
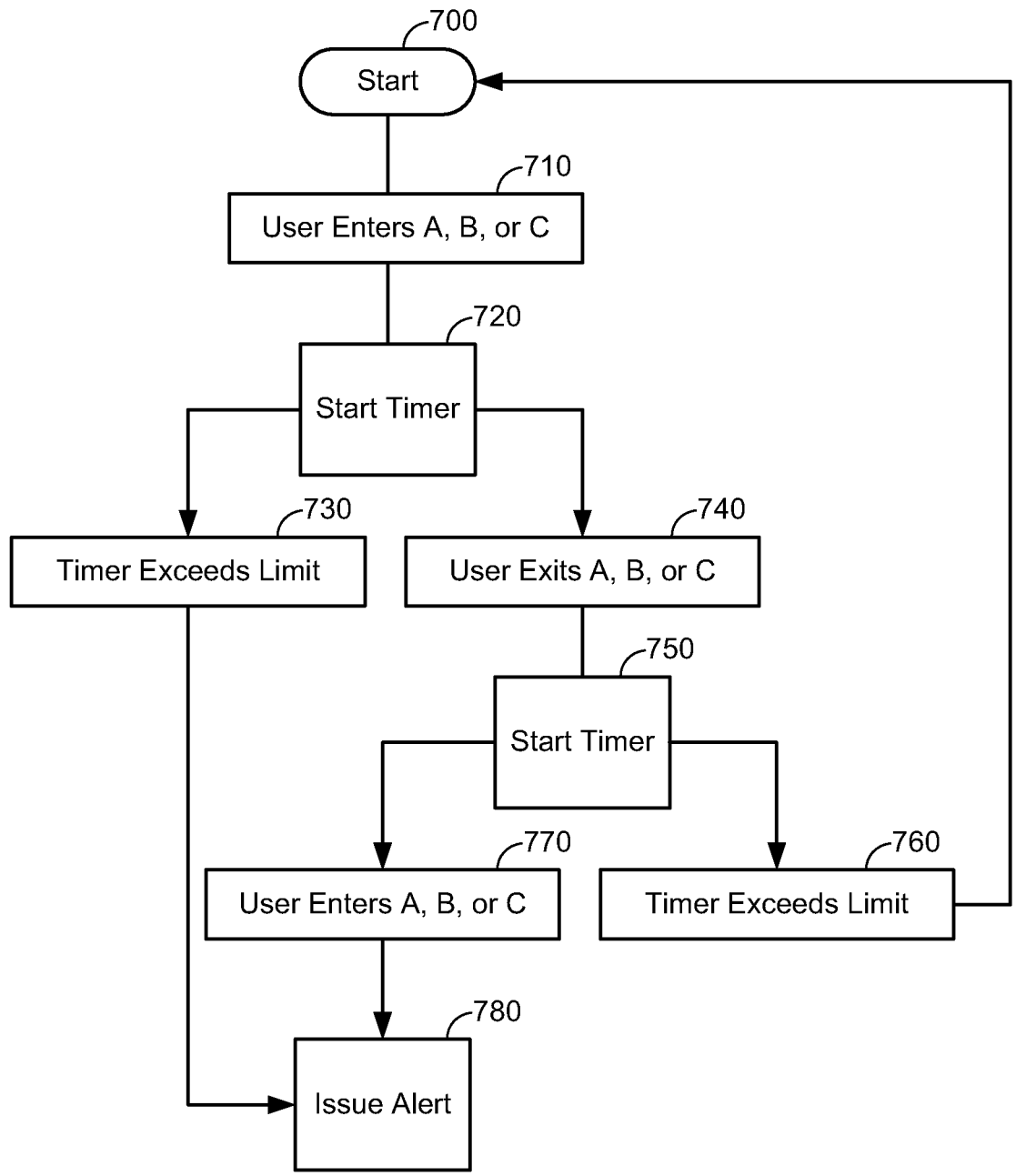
FIG. 7 illustrates an exemplary embodiment in which an alert is triggered if a user remains within a geo-fence for more than a time limit or re-enters the geo-fence within a time limit.

FIG. 7 illustrates an exemplary embodiment in which an alert is triggered if a user remains within any of one or more geo-fences for more than a time limit or enters any of the one or more geo-fences within a time limit after leaving the previous geo-fence. Specifically, in the example of FIG. 7, if the user remains in one of geo-fences A, B, or C for longer than a specified time, or enters one of geo-fences A, B, or C within a specified time after leaving one of geo-fences A, B, or C, an alert is issued. As an example, geo-fences A, B, and C may be parking spaces, parking lots, municipal parking zones, or the like.

The flow begins at 700. At 710, the user enters one of geo-fences A, B, or C. The breach causes a timer to start at 720. The timer may run on the user's location-aware device, or on a server. The server may receive the user device's position, determine whether or not there has been a breach, and start the timer based on the determined breach. Alternatively, the server may receive notice of a breach from the user device and start a timer in response. If, at 730, the timer exceeds the time limit, then at 780, an alert is issued. If geo-fences A, B, and C are municipal parking zones, the time limit may be, for example, one hour.

If, however, the user exits the geo-fence A, B, or C at 740, then at 750, a new timer is started in the same way as the first. If at 760 the timer exceeds the time limit, then the flow returns to 700 and starts over. If, however, the user enters one of geo-fences A, B, or C before the timer expires (770), then at 780 an alert is issued. The alert may be a warning to the user that they are not permitted to enter geo-fences A, B, and C within the time limit of having left one of geo-fences A, B, or C. An alert may also be sent to the municipality informing it of the violation.

Figure 8:
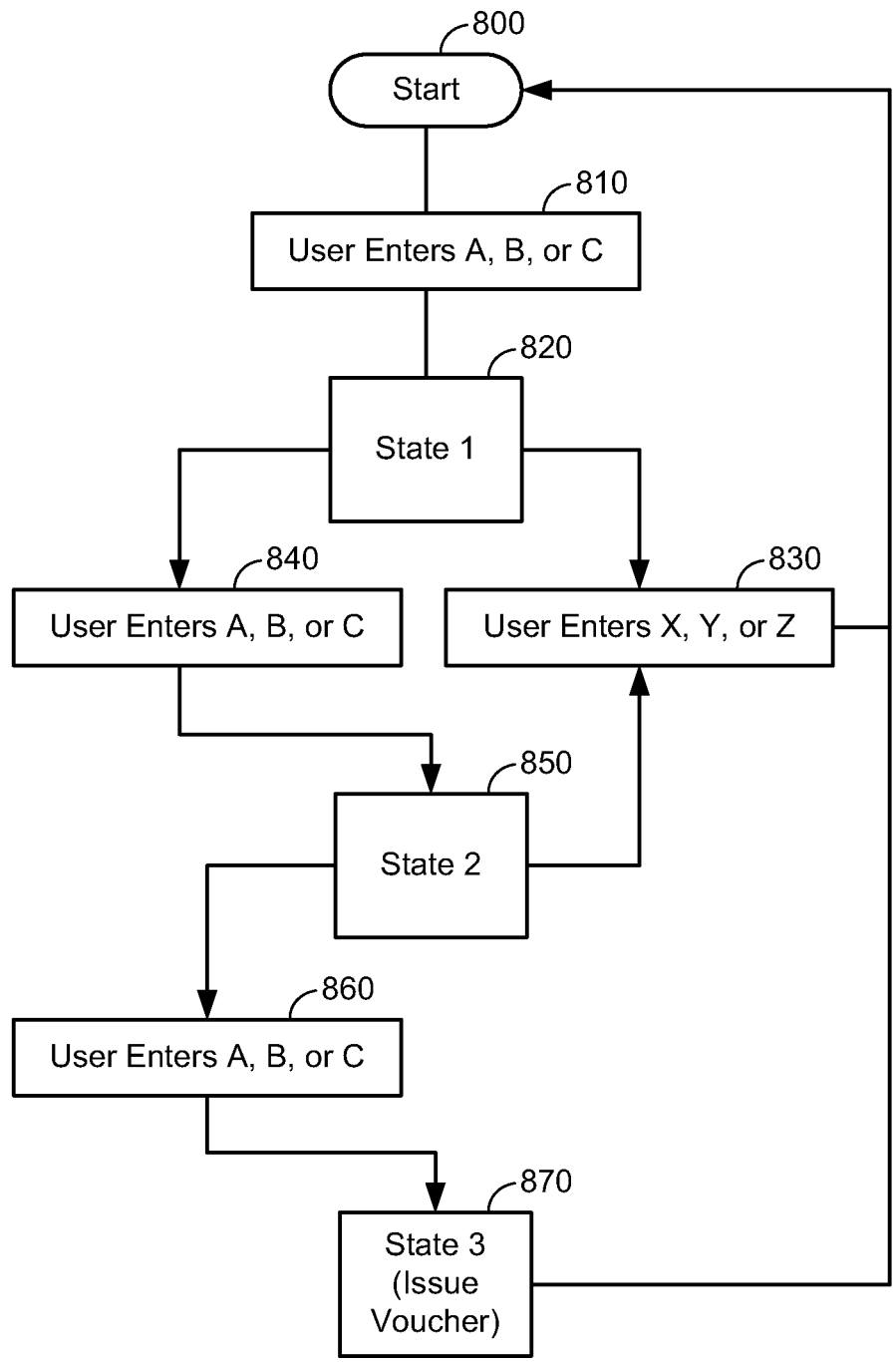

FIG. 8 illustrates an exemplary embodiment in which an event is triggered if a user enters any of a given number of geo-fences a given number of times without entering one or more other geo-fences in between. Specifically, the user will be issued a voucher or other coupon if the user visits any of geo-fences A, B, or C at least three times without visiting any of geo-fences X, Y, and Z. As an example, geo-fences A, B, and C may be a chain of retail stores or restaurants, and geo-fences X, Y, and Z may be competitors.

The embodiment of FIG. 8 is illustrated as being implemented as a state machine, but it may alternatively be implemented as a counter. The flow begins at 800. At 810, the user enters one of geo-fences A, B, or C. At 820, the breach causes the state associated with the user to transition to state 1. At 830, the user enters one of geo-fences X, Y, or Z, causing the flow to return to 800 and start over.

If, however, at 840, the user enters any of geo-fences A, B, or C, the breach causes the user's state to transition to state 2 at 850. If the user enters one of geo-fences X, Y, or Z at this point (830), the flow to returns to 800 and starts over. If, however, the user again enters any of geo-fences A, B, or C (860), then at 870, the user's state transitions to state 3. Entering state 3 at 870 triggers an event. In the example of FIG. 8, that event is issuing a voucher or other coupon to the user for visiting any of geo-fences A, B, or C at least three times without visiting any of geo-fences X, Y, and Z.

Figure 9:
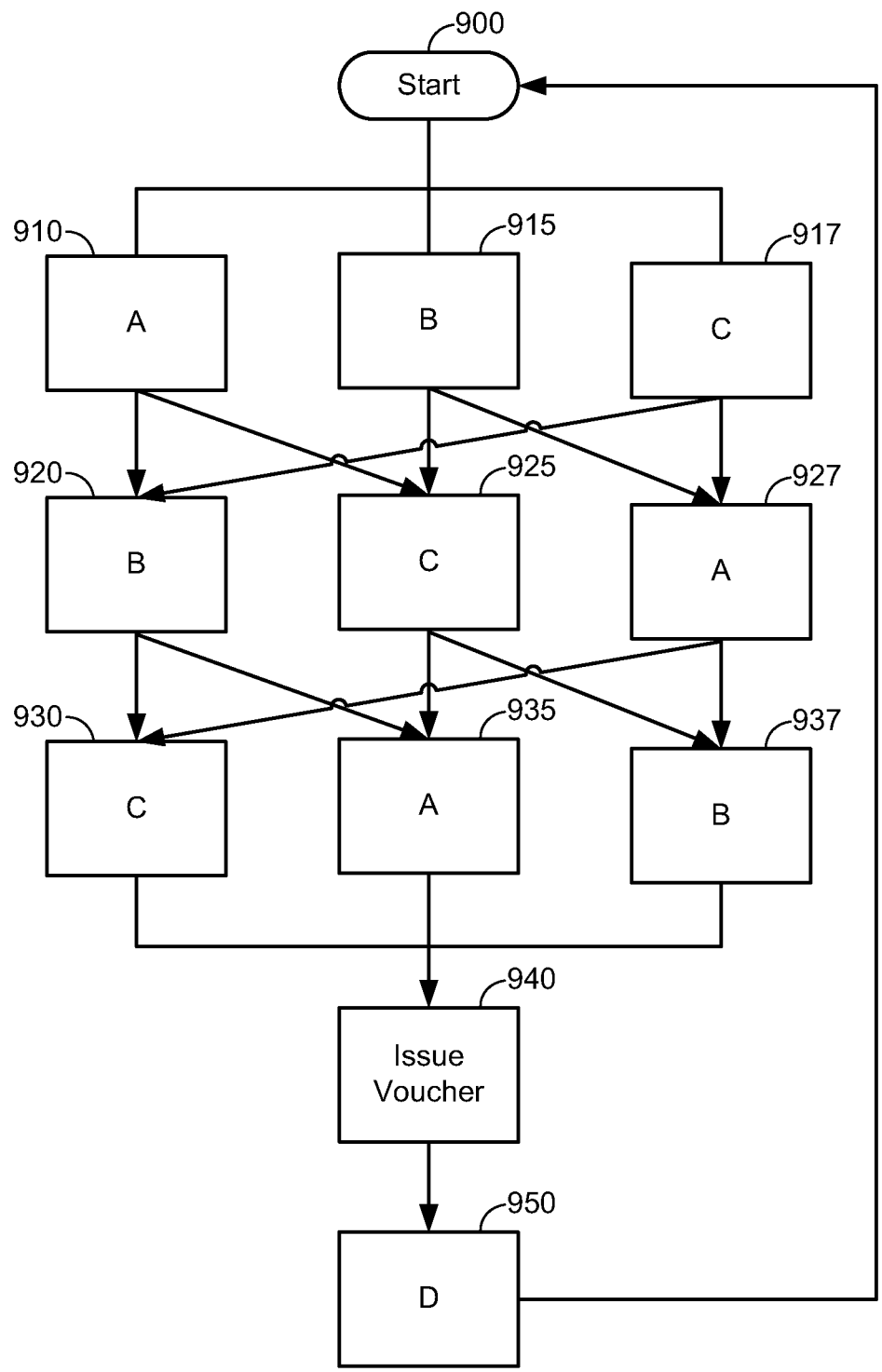
FIG. 9 illustrates an exemplary embodiment in which an event is triggered if a user breaches certain geo-fences.

FIG. 9 illustrates an exemplary embodiment in which an event is triggered if a user breaches certain geo-fences. Specifically, if the user breaches geo-fences A, B, and C, a voucher or other coupon is issued for the location at geo-fence D. As an example, geo-fences A, B, C, and D may be the perimeters of rides at an amusement park, and the voucher may permit the user to go to the front of the line of the ride at geo-fence D. After the user has ridden the ride, the voucher is voided. The example embodiment of FIG. 9 may also apply to visiting a group of restaurants or shops, watching a set of movies at a theater, and the like.

The flow begins at 900. If the user breaches geo-fence A, indicating that the user is riding the ride within geo-fence A, the flow proceeds to 910. The user may then breach geo-fence B at 920 or geo-fence C at 925. If the user breaches geo-fence A again, it is not counted towards the user breaching geo-fences A, B, and C, as in this example, it does not matter how many times the user breaches the same geo-fence. At 920, after breaching geo-fence B, the user must breach geo-fence C at 930 to advance to 940 and trigger the issuance of the voucher. At 925, after breaching geo-fence A (910), the user must breach geo-fence B at 937 to advance to 940.

If, after 900, the user breaches geo-fence B, the flow proceeds to 915. The user may then breach geo-fence C at 925 or geo-fence A at 927. At 925, after breaching geo-fence C, the user must breach geo-fence A at 935 to advance to 940 and trigger the issuance of the voucher. At 927, after breaching geo-fence A, the user must breach geo-fence C at 930 to advance to 940.

If, after 900, the user breaches geo-fence C, the flow proceeds to 917. The user may then breach geo-fence B at 920 or geo-fence A at 927. At 920, after breaching geo-fence B, the user must breach geo-fence A at 935 to advance to 940 and trigger the issuance of the voucher. At 927, after breaching geo-fence A, the user must breach geo-fence B at 937 to advance to 940.

Once the user breaches geo-fences A, B, and C, in any order, then at 940, a voucher is issued for geo-fence D. Once the user breaches geo-fence D at 950, the voucher is invalidated and the flow returns to 900.

Figure 10:
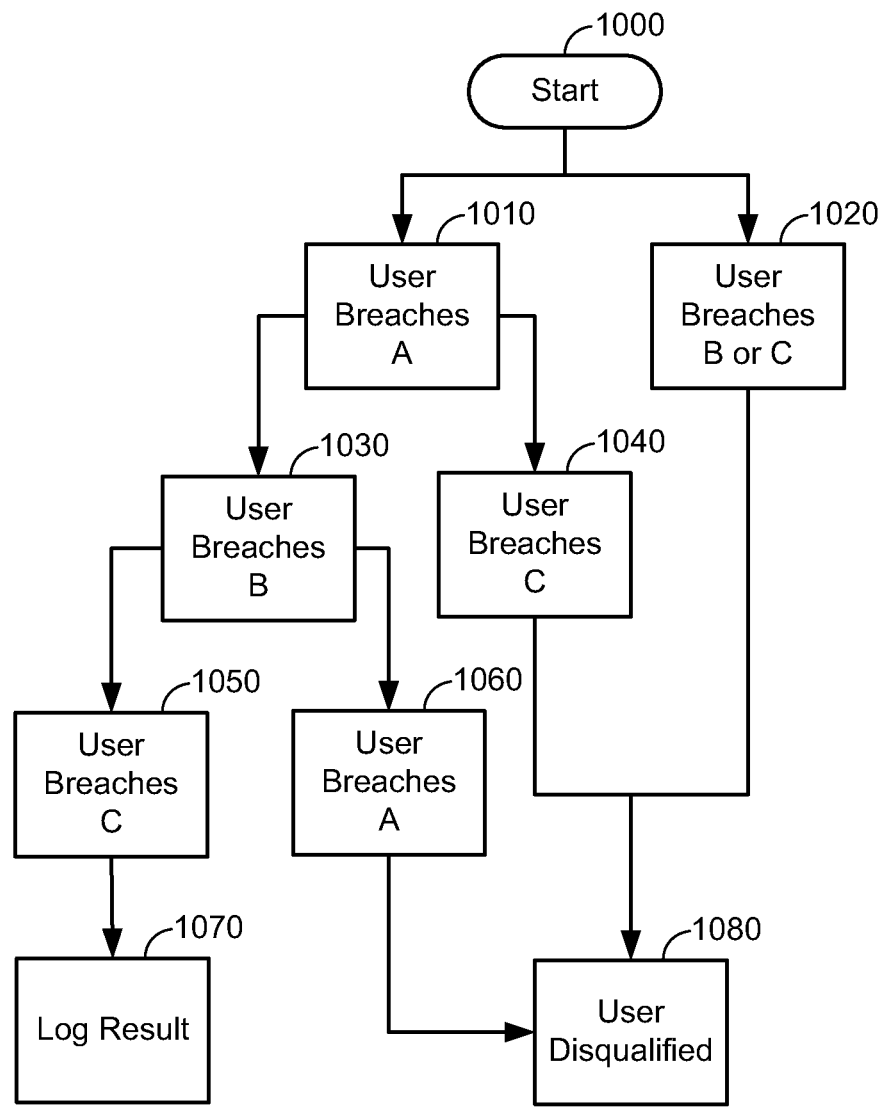
FIG. 10 illustrates an exemplary embodiment in which a user must breach a set of geo-fences in a particular order.

FIG. 10 illustrates an exemplary embodiment in which a user must breach a set of geo-fences in a particular order. Specifically, in the example of FIG. 10, the user must breach geo-fence A, then geo-fence B, then geo-fence C. As an example, geo-fences A, B, and C may be checkpoints for a race. Geo-fence A may be the starting line, geo-fence B may be a checkpoint, and geo-fence C may be the finish line. Alternatively, the example illustrated in FIG. 10 can apply to any situation where the order in which a user breaches various geo-fences is important.

The flow begins at 1000. At 1010, the user breaches geo-fence A. Alternatively, if the user skips geo-fence A and breaches either geo-fence B or C at 1020, then at 1080, the user is disqualified. After breaching geo-fence A (1010), the user can breach geo-fence B at 1030. If, however, the user breaches geo-fence C at 1040, then at 1080, the user is disqualified. After breaching geo-fence B (1030), the user can breach geo-fence C at 1050 or geo-fence A at 1060. If the user breaches geo-fence A at 1060, then at 1080, the user is disqualified. After breaching geo-fence C (1050), an event is triggered at 1070. The event may be, for example, logging the fact that the user visited each geo-fence in turn. It may also include, as in the case of a race, the time it took the user to visit each geo-fence in turn.

While FIGS. 4-10 have been illustrated in terms of a single user device, the disclosure is not so limited. Rather, the rules can specify that a plurality of related devices must breach certain geo-fences under certain conditions in order to trigger an alert. For example, rather than a single user device breaching the plurality of geo-fences as illustrated in FIGS. 4-10, a group of related devices, such as those belonging to a group of friends or family members, may have to breach the plurality of geo-fences in the specified manner. It may be that each device must breach the plurality of geo-fences as specified, or the breaches in aggregate must satisfy the specified conditions.

Figure 11:
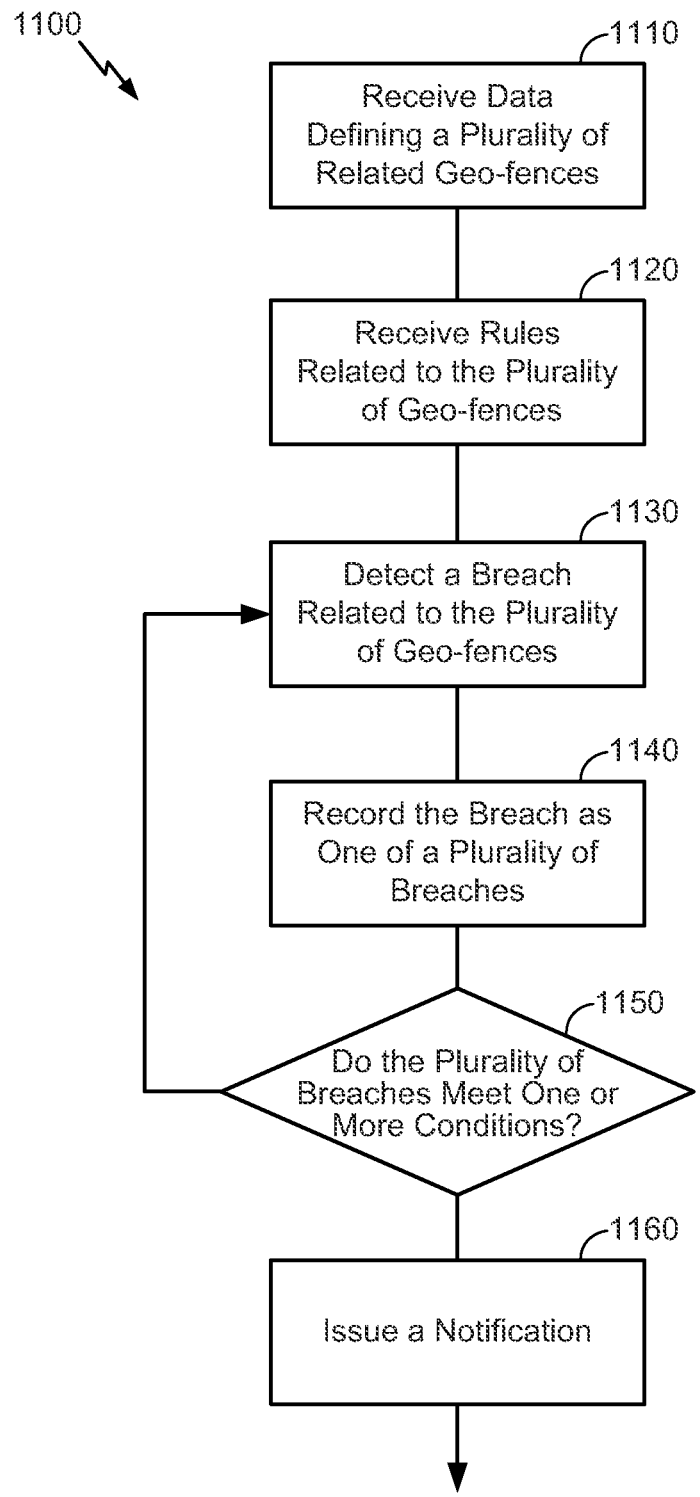
FIG. 11 illustrates an exemplary flow according to an embodiment.

FIG. 11 illustrates an exemplary flow 1100 according to an embodiment. The flow 1100 can be performed by a location-aware device, such as apparatus 100, UE 200A, or UE 200B, or by a server.

At 1110, the location-aware device or server receives data defining a plurality of related geo-fences. If flow 1100 is being performed by a server, the server can receive the geo-fence data from an administrator. If flow 1100 is being performed by a location-aware device, the device can download the geo-fence data from a server.

At 1120, the location-aware device or server receives rules related to the plurality of geo-fences. Various rule scenarios are illustrated in FIGS. 4-10. The rules specify one or more conditions that use the value of one or more counters or state machines and/or one or more timers to determine whether or not to issue an alert. The one or more counters or state machines and/or one or more timers track one or more devices' geo-fence breaches. Similar to 1110, if flow 1100 is being performed by a server, the server can receive the rules from an administrator. If flow 1100 is being performed by a location-aware device, the device can download the rules from a server.

At 1130, the location-aware device or server detects a breach related to the plurality of geo-fences. The breach may be an entrance or exit breach. If defined in the rules, the location-aware device or server can also start or stop a timer. If flow 1100 is being performed by a server, the server can detect the breach based on position information received from the location-aware device. Alternatively, the server can detect the breach by receiving notice of the breach from the location-aware device. If flow 1100 is being performed by the location-aware device, the device can detect the breach by comparing its position to the coordinates of the geo-fence.

At 1140, the location-aware device or server records the breach as one of a plurality of breaches. Recording the breach as one or a plurality of breaches can include incrementing or decrementing a counter or changing a state of a state machine associated with the location-aware device. The location-aware device or server increments or decrements the counter or changes the state of the state machine based on the received rules. That is, the rules define whether or not the counter should be incremented or decremented or the state machine changed based on the type of breach. If defined in the rules, the location-aware device or server can also start or stop a timer. If flow 1100 is being performed by a server, the server can record the breach after detecting the breach or receiving notice of the breach from the location-aware device. If flow 1100 is being performed by the location-aware device, the device can record the breach.

At 1150, the location-aware device or server determines whether or not the plurality of breaches (i.e. the value of the counter or the state of the state machine) meets one or more conditions. The one or more conditions are defined by the rules, and can include, but are not limited to, any of the scenarios illustrated in FIGS. 4-10. The one or more conditions can be any conditions that use the value of one or more counters or state machines and/or one or more timers to track one or more devices' geo-fence breaches and to determine whether or not to issue an alert.

If the plurality of breaches do not meet the one or more conditions, flow 1100 returns to 1130 to detect another breach. If the plurality of breaches do meet the condition, however, then at 1160, the location-aware device or server issues a notification. The notification may be a warning, an alert, a coupon, a voucher, a pointer to additional information, or the like. If flow 1100 is being performed by a server, the server can send the notification to the location-aware device, the administrator, or a third party defined in the rules. If flow 1100 is being performed by a location-aware device, the device can display the notification to the user, send the notification to the server, or send the notification to a third party defined in the rules.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for providing a notification based on breaching a plurality of geo-fence perimeters, comprising:
   detecting a breach related to the plurality of geo-fence perimeters, the breach corresponding to a breach of one of the plurality of geo-fence perimeters;
   incrementing or decrementing a counter upon detection of the breach based on a rule associated with the counter, wherein the breach is one of a plurality of breaches of the plurality of geo-fence perimeters, wherein a value of the counter corresponds to a number of the plurality of breaches of the plurality of geo-fence perimeters, and wherein the rule associated with the counter defines whether the counter is incremented or decremented upon detection of the breach;

determining whether the counter reaches a threshold; and based on the counter reaching the threshold, issuing a notification.

2. The method of claim 1, wherein the method is performed by a location-aware user device.

3. The method of claim 1, wherein the method is performed by a server.

4. The method of claim 3, wherein the detecting comprises receiving data representing the breach from a user device.

5. The method of claim 1, wherein the notification is one of a short message service (SMS) message, a multimedia messaging service (MMS) message, or an email.

6. The method of claim 1, wherein the notification is one of a voucher, a coupon, an information pointer, or a warning alert.

7. The method of claim 1, further comprising determining whether or not a given one of the plurality of geo-fence perimeters was entered less than a threshold period of time after another one of the plurality of geo-fence perimeters was exited.

8. The method of claim 1, wherein the determining comprises determining whether the counter exceeds the threshold.

9. The method of claim 1, wherein the plurality of geo-fence perimeters are related to each other.

10. The method of claim 1, further comprising determining whether or not the plurality of geo-fence perimeters were breached without breaching a second geo-fence perimeter.

11. The method of claim 1, further comprising determining whether or not an amount of time a user remains in given one of the plurality of geo-fence perimeters is greater than a threshold.

12. The method of claim 1, further comprising determining whether or not the user re-enters the given one of the plurality of geo-fence perimeters after an amount of time less than a threshold.

13. The method of claim 1, further comprising determining whether or not the plurality of geo-fence perimeters were breached without breaching any of a second plurality of geo-fence perimeters.

14. The method of claim 1, further comprising determining whether or not the plurality of breaches comprise a plurality of breaches of a given set of geo-fence perimeters.

15. The method of claim 14, wherein the issuing the notification comprises, based on the plurality of breaches comprising the plurality of breaches of the given set of geo-fence perimeters, issuing a voucher related to an entity surrounded by a second geo-fence perimeter.

16. The method of claim 1, further comprising determining whether or not the plurality of geo-fence perimeters were breached in a given order.

17. An apparatus for providing a notification based on breaching a plurality of geo-fence perimeters, comprising:

logic configured to detect a breach related to the plurality of geo-fence perimeters, the breach corresponding to a breach of one of the plurality of geo-fence perimeters;

logic configured to increment or decrement a counter upon detection of the breach based on a rule associated with the counter, wherein the breach is one of a plurality of breaches of the plurality of geo-fence perimeters, wherein a value of the counter corresponds to a number of the plurality of breaches of the plurality of geo-fence perimeters, and wherein the rule associated with the counter defines whether the counter is incremented or decremented upon detection of the breach;

logic configured to determine whether the counter reaches a threshold;

and logic configured to issue, based on the counter reaching the threshold, a notification.

18. The apparatus of claim 17, wherein the apparatus is a location- aware user device.

19. The apparatus of claim 17, wherein the apparatus is a server.

20. The apparatus of claim 19, wherein the logic configured to detect comprises logic configured to receive data representing the breach from a user device.

21. The apparatus of claim 17, wherein the notification is one of a short message service (SMS) message, a multimedia messaging service (MMS) message, or an email.

22. The apparatus of claim 17, wherein the notification is one of a voucher, a coupon, an information pointer, or a warning alert.

23. The apparatus of claim 17, further comprising logic configured to determine whether or not a given one of the plurality of geo-fence perimeters was entered less than a threshold period of time after another one of the plurality of geo-fence perimeters was exited.

24. The apparatus of claim 17, further comprising logic configured to determine whether or not a number of the plurality of geo-fence perimeters is greater than a threshold.

25. The apparatus of claim 24, wherein the plurality of geo-fence perimeters are related to each other.

26. The apparatus of claim 17, further comprising logic configured to determine whether or not the plurality of geo-fence perimeters were breached without breaching a second geo-fence perimeter.

27. The apparatus of claim 17, further comprising logic configured to determine whether or not an amount of time a user remains in given one of the plurality of geo- fence perimeters is greater than a threshold.

28. The apparatus of claim 27, further comprising logic configured to determine whether or not the user re-enters the given one of the plurality of geo-fence perimeters after an amount of time less than a threshold.

29. The apparatus of claim 17, further comprising logic configured to determine whether or not the plurality of geo-fence perimeters were breached without breaching any of a second plurality of geo-fence perimeters.

30. The apparatus of claim 17, further comprising logic configured to determine whether or not the plurality of breaches comprises a plurality of breaches of a given set of geo-fence perimeters.

31. The apparatus of claim 30, wherein the logic configured to issue the notification comprises logic configured to issue, based on the plurality of breaches comprising the plurality of breaches of the given set of geo-fence perimeters, a voucher related to an entity surrounded by a second geo-fence perimeter.

32. The apparatus of claim 17, further comprising logic configured to determine whether or not the plurality of geo-fence perimeters were breached in a given order.

33. An apparatus for providing a notification based on breaching a plurality of geo-fence perimeters, comprising:

means for detecting a breach related to the plurality of geo-fence perimeters, the breach corresponding to a breach of one of the plurality of geo-fence perimeters;

means for incrementing or decrementing a counter upon detection of the breach based on a rule associated with the counter, wherein the breach is one of a plurality of breaches of the plurality of geo-fence perimeters, wherein a value of the counter corresponds to a number of the plurality of breaches of the plurality of geo-fence perimeters, and wherein the rule associated with the counter defines whether the counter is incremented or decremented upon detection of the breach;

means for determining whether the counter reaches a threshold; and means for issuing a notification based on the counter reaching the threshold.

34. A non-transitory computer-readable medium for providing a notification based on breaching a plurality of geo-fence perimeters, comprising:

at least one instruction to detect a breach related to the plurality of geo-fence perimeters, the breach corresponding to a breach of one of the plurality of geo-fence perimeters;

at least one instruction to increment or decrement a counter upon detection of the breach based on a rule associated with the counter, wherein the breach is one of a plurality of breaches of the plurality of geo-fence perimeters, wherein a value of the counter corresponds to a number of the plurality of breaches of the plurality of geo-fence perimeters, and wherein the rule associated with the counter defines whether the counter is incremented or decremented upon detection of the breach;

at least one instruction to determine whether the counter reaches a threshold; and at least one instruction to issue, based on the counter reaching the threshold.

* * * * *